April 4, 1961

W. H. HIGHLEYMAN 2,978,675

CHARACTER RECOGNITION SYSTEM

Filed Dec. 10, 1959

4 Sheets-Sheet 1

INVENTOR
W. H. HIGHLEYMAN
BY A. E. Hirsch Jr.
ATTORNEY

INVENTOR
W. H. HIGHLEYMAN
BY A. E. Hirsch Jr.
ATTORNEY

INVENTOR
W. H. HIGHLEYMAN
BY C. E. Hirsch Jr.
ATTORNEY

April 4, 1961 W. H. HIGHLEYMAN 2,978,675

CHARACTER RECOGNITION SYSTEM

Filed Dec. 10, 1959

4 Sheets-Sheet 4

INVENTOR
W. H. HIGHLEYMAN
BY Q. E. Hirsch, Jr.
ATTORNEY

United States Patent Office 2,978,675

Patented Apr. 4, 1961

2,978,675

CHARACTER RECOGNITION SYSTEM

Wilbur H. Highleyman, Summit, N.J., assignor to Bell Telephone Laboratories, Incorporated, New York, N.Y., a corporation of New York Filed Dec. 10, 1959, Ser. No. 858,767

14 Claims. (Cl. 340—149)

This invention relates to automatic pattern recognition and more particularly to apparatus for automatically classifying visual patterns independent of variations in style or form assumed by the characters contained in a representative input alphabet of patterns. Its principal objects are to obtain reliable, fully automatic translation of alpha-numeric characters and the like into unique electrical or mechanical activity, and to insure a high degree of discrimination between similarly formed characters in the alphabet.

One of the class of automatic pattern recognition systems adapted to convert patterns such as the alpha-numeric characters of an alphabet into a language acceptable by automatic machines such as computers may be categorized as statistical systems. In statistical recognition methods the area occupied by each character of the alphabet is analyzed and resolved into a matrix of smaller areas or elements. Each element of the resulting matrix is weighted according to the probability that a portion of a like character will occupy it. Probability information of this sort is generally obtained from an analysis of a large sample of representative characters. A pattern whose identity is to be established is likewise resolved into a matrix of marked and unmarked elements. This matrix is compared to the probability matrices of each character and, depending upon the set of rules employed, the character with the highest probability of correspondence is selected to identify the pattern. Statistical methods allow some flexibility in the character formation since the probability matrices are selected from a large number of possible input signals. Moreover, most statistical methods may be implemented by using analog methods and therefore are in general quite economical.

Accordingly, in the present invention, a statistical approach to character recognition is adopted as the starting point. The data necessary for a statistical catalog of alphabet characters are obtained by analyzing a large sample of characters, each of which has been properly aligned in a viewing field, and resolving each into a matrix of smaller elements. The elements are assigned a "mark" status if occupied by a portion of the character and a "no-mark" status if the element is unoccupied. After many samples of a particular character have been analyzed, the probability of a mark falling in each resolution area is determined. For example, if one hundred samples of the character T are analyzed and if in seventy five of the cases a particular element is marked, then this element is assigned a probability of 0.75. In this fashion a probability matrix for each character is constructed.

The pattern to be recognized is subsequently compared with each of these matrices under a governing set of rules and the best pattern-character fit is determined. If, for example, the measure of pattern-character fit is based solely on the largest value of cross-correlation function computed as the input pattern is compared with each stored matrix, recognition may be unreliable since one pattern may have the same cross-correlation function when compared to several different characters, only one of which is a true character. Thus, discriminability between cross-correlation functions computed for similar characters in the alphabet is low.

In the present invention the rule governing comparisons is based only in part on the computation of the cross-correlation between the pattern being interrogated and each of a set of probability matrices representing an acceptable alphabet. Instead, a somewhat more meaningful measure of pattern-character correspondence is obtained. Thus, a pattern to be cataloged is treated as an input signal and the probability matrix representing the selected character is defined as a "true" signal. Thus, the input signal is actually one of the true signals plus some noise. The problem then reduces to deciding which true signal is actually contained in the incoming signal. This is accomplished by assuming that the incoming pattern actually represents a character represented by one of the stored probability matrices, and by computing a signal-to-noise ratio for the incoming signal in the environment of all of the probability matrices in the alphabet. The computation procedure continues until a signal-to-noise ratio has been formed for the incoming pattern with each of the true signals of the alphabet. The largest signal-to-noise ratio obtained is selected to identify the unknown pattern as the corresponding true signal.

In order to develop a signal-to-noise ratio sufficiently large that it may safely be assumed that the identity of the input pattern corresponds to one of the stored probability matrices, it is evident that the relative position of the input character as defined, for example, by an arbitrary set of coordinates common both to the character and to the stored matrices, must be such as to coincide with that of the stored matrices. It is in accordance with the present invention to insure such a coincidence condition by effectively shifting the input character element by element in at least two dimensions of the common coordinate system, and to detect the highest correlation between the input character and each stored matrix.

The invention in one of its principal forms is actualized by assuming that a true signal for a particular character is the probability matrix representing that character. Hence, there can never be a perfect character since all patterns are quantized into ones and zeros, whereas the probability matrices contain numbers between one and zero. A pattern will, however, resemble one probability matrix more than any other; and will do so sufficiently that the similarity may be utilized as the basis of recognition. For the assumed definition of a true signal, the noise contained in a pattern when compared to a particular character is the difference between the pattern matrix and the probability matrix. The signal-to-noise ratio of a pattern, when considered as a particular character, may thus be expressed as a function of the pattern, a function of the probability matrix, and a function of the sum of the probabilities of the marked elements as follows:

$$\frac{S}{N}=\frac{Q}{P+M-2Q} \qquad (1)$$

where: P represents the number of matrix elements marked by the pattern and is a function of the pattern only; M represents the sum of the squares of the probabilities in the matrix for the particular character in question and is a function of the probability matrix only; and Q denotes the cross-correlation function between the pattern and the probability matrix and is thus a measure of the degree of correspondence of the two. It can be shown that for quantized probability distributions the cross-correlation function is equal to the sum of the probabilities of the marked elements.

From these relationships it is evident that in the absence of noise it is possible for the input pattern exactly to match the probability matrix. In this case the signal-to-noise ratio is infinite and $$Q=Q_{max}=\frac{P+M}{2} \quad (2)$$

where: $Q_{max}$ is the maximum possible value of the cross-correlation function Q. Letting $$\bar{Q}=\frac{Q}{Q_{max}}=\frac{2Q}{M+P} \quad (3)$$

where $\bar{Q}$ represents a normalized value of Q, i.e., a value of Q normalized by $Q_{max}$, Equation 1 can be rewritten more conveniently in the following form:

$$\frac{S}{N}=\frac{1}{2}\frac{\bar{Q}}{1-\bar{Q}} \quad (4)$$

The relative discrimination properties of the function Q and the signal-to-noise ratio function $S/N$ can be deduced by studying the derivative $$k=\frac{d(S/N)}{d\bar{Q}}=\frac{1}{2}\frac{1}{(1-\bar{Q})^2} \quad (5)$$

When $k$ is greater than 1 then the signal-to-noise ratio varies at a greater rate than $\bar{Q}$ and consequently will discriminate to a greater extent between two similar characters than will $\bar{Q}$. The opposite is true, of course, when $k$ is less than 1. From Equation 5, $\bar{Q}$ is equal to 0.293 when $k$ is equal to 1. Thus, if the normalized correlation coefficient is greater than 0.293 the signal-to-noise ratio gives an improvement in discrimination over the simple cross-correlation function. A value $\bar{Q}$ equal to 0.293 actually indicates a fairly poor match between the input pattern and the probability matrix, one that normally would be rejected prior to identification. Hence, in all cases in which the input pattern matches one of the probability matrices closely enough to support an identification on that match, the signal-to-noise ratio used as the decision criterion gives better discrimination than the cross-correlation function.

These relationships are turned to account in implementing the apparatus of the present invention by shifting the pattern to be recognized with respect to the probability matrix to find an optimum position, i.e., by observing the maximum value of cross-correlation which gives the maximum signal-to-noise ratio. Advantageously, this procedure divorces the recognition procedure from the exact character position in a field of view. Inasmuch as some characters are inherently noisier than others, a comparison of the signal-to-noise ratios provides, in reality, but a close approximation to the identity of the pattern as one of the stored characters. Preferably the comparison is made therefore between a normalized ratio which may be defined as the quotient of the actual signal-to-noise ratio and the average expected signal-to-noise ratio for a character. The average ratio is generally different for each character. Since the probability distribution of each character is known, the average signal-to-noise ratio is easily determined. It is a function only of the probability distribution.

As a further refinement, a threshold of acceptability may be established and employed to initiate a re-examination of characters whose recognition is marginal, or to reject them entirely. For this, a minimum signal-to-noise ratio and a minimum separation between the ratios for the best and next best character are established as conditions for an allowable recognition.

Other objects, features, the nature of the present invention and its various advantages will be more fully understood upon consideration of the appended drawings and the following detailed description of the drawings. In the drawings.

Figure 1:
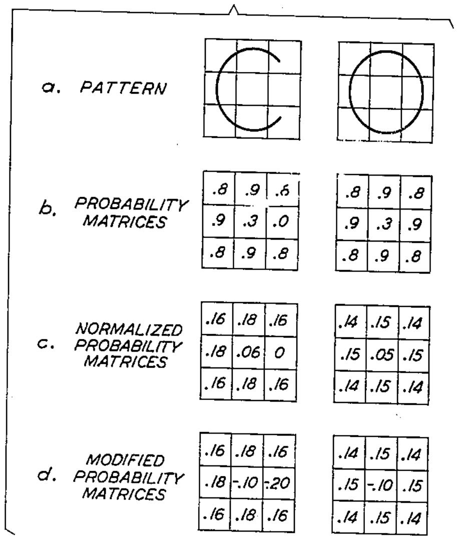
Fig. 1 is an illustration of various probability matrices for typical alphabet characters that is useful in explaining the invention.

Before entering upon a detailed description of the apparatus of the invention and of the fashion in which it operates, it will be advantageous to consider graphically a number of the concepts upon which recognition is achieved. Fig. 1 illustrates various probability matrices for the representative characters O and C together with the expected occupancy (mark) condition of a matrix by corresponding patterns representing the characters. Typical characters are depicted in row *a*; row *b* illustrates typical probability matrices for the characters; row *c* denotes normalized matrices for the same characters and, in accordance with another feature of the invention, representative modified matrices are shown in row *d*. Simplified 3 x 3 matrices are illustrated for simplicity of exposition; in practice, larger matrices, for example, 12 x 12 matrices, are employed. To illustrate the manner of establishing the identity of a given pattern, an unknown pattern, for example, the C of row *a* is initially positioned in a matrix of elemental areas in a fashion to be described hereinafter, and then a signal-to-noise computation is performed between the pattern matrix and the probability matrices for all of the characters in the entire alphabet. The maximum signal-to-noise ratio obtained indicates the alphabet character most nearly represented by the unkown pattern.

An example may serve to clarify the nature of the computation. For the pattern C and the matrices shown in row *b* of Fig. 1, the following values are found:

| For the pattern compared to C matrix | For the pattern compared to O matrix |
|---|---|
| P=7.0<br>M=5.08<br>Q=5.9<br>S/N=20.4 | P=7.0<br>M=5.89<br>Q=5.9<br>S/N=5.4 |

From this it is evident that both patterns yield identical cross-correlation functions Q, and hence cannot be distinguished one from the other by this factor alone. However, the signal-to-noise ratios $S/N$ are substantially different one from the other and yield a usable measure of pattern identity. As indicated above, some characters are inherently noisier than others. Accordingly, it has been found that a comparison of normalized signal-to-noise ratios (quotient of actual to average ratios) results in a superior indication of character identity. Moreover, a comparison of the normalized ratios provides superior discrimination, even as between closely correlated patterns, than does a corresponding comparison of the cross-correlation functions alone.

Figure 2:
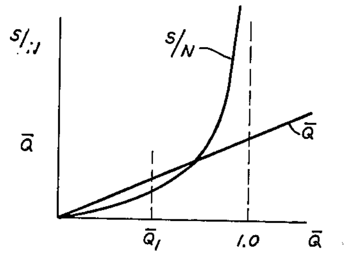
Fig. 2 is a graph illustrating the improvement in discrimination obtained by means of the invention.
Figure 3:
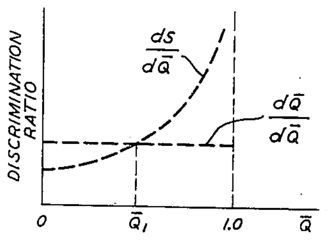
Fig. 3 is another curve illustrating the improvement in discrimination afforded by the invention.

The improvement in discrimination is illustrated graphically in the curves of Fig. 2. In Fig. 2, $S/N$ is plotted against the normalized cross-correlation function $\bar{Q}$ together with a plot of $\bar{Q}=\bar{Q}$. In the figure, $\bar{Q}_1$ represents the critical value $\bar{Q}=0.293$ discussed above. At $\bar{Q}=\bar{Q}_1$ the slopes of the two curves are equal. For all values of $\bar{Q}$ greater than $\bar{Q}_1$, the $S/N$ criterion gives superior discrimination than does $\bar{Q}$. Another indication of the improvement in discrimination afforded by the signal-to-noise criterion is obtained by plotting the ratio of the slopes of $S/N$ and $\bar{Q}$ with respect to $\bar{Q}$. Such a plot is shown in Fig. 3. It indicates that at a particular value of $\bar{Q}$ the $S/N$ criterion provides considerably greater discrimination than does $\bar{Q}$.

Although a computation of the signal-to-noise ratio in accordance with Equation 1 is accomplished in a straight-forward fashion, certain simplifications are possible which reduce only slightly the accuracy of computation in return for a substantial simplification in implementation. One modification that has been found effective involves both a form of normalization and penalization. Thus the matrices are normalized so that all "average" characters receive the same summation when compared to their respective matrices and all matrix elements having a low probability are assigned a negative weighting factor. These modifications are justified since as a rule the noise level is high when the pattern passes through matrix areas of low probability or, more generally, when the pattern does not pass through an area of high probability.

The effect of normalizing and penalizing is illustrated in the matrices of rows *c* and *d* in Fig. 1. In the unmodified matrices of row *b* a pattern, e.g., C, has an identical cross-correlation function when compared to either the O or C matrix. However, if the C matrix is normalized by the factor $M=5.08$ and the O matrix by the factor $M=5.89$, the normalized probability matrices shown in row *c* are produced. The normalized cross-correlation $Q/M$ for the pattern C of row *a* as compared to the C matrix of row *c* is 1.18 and the function $Q/M$ for C as compared to the O matrix is 1.01. Thus the pattern is clearly identified as a C, though not with the degree of discrimination obtained because of the process of normalization. However, if the O of row *a* is compared to these matrices, $Q/M$ for the O matrix is 1.16 and $Q/M$ for the C matrix is equal to 1.18. Hence, an error is made in the identification in this case. This error is avoided by suitably modifying the matrices to include a penalization factor, e.g., by assigning to the low probability areas negative penalty weights as indicated in the modified matrices of row *d*. With penalization, the cross-correlation function of O as compared with the C matrix is equal to .98 and as compared with the O matrix is equal to 1.16; the pattern is now recognized correctly.

Thus the normalized cross-correlation function modified by adding penalty areas once again approximates the signal-to-noise ratio. As a further improvement thresholds may be established so that particularly noisy characters are rejected entirely. Thus if the modified cross-correlation figure is too small or, alternatively, if the best and next best measures of signal-to-noise ratio of a particular character are too nearly the same, the character is rejected as unreadable.

Figure 4:
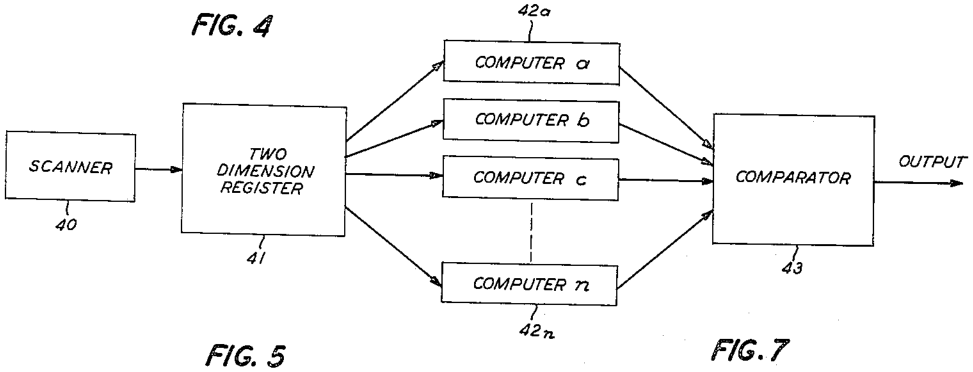
Fig. 4 is a block schematic diagram illustrating the preferred mode of operation of the present invention.

The various ratios utilized in the computation which admit to a recognition of an unknown pattern are obtained in the present invention by means of apparatus of the general form illustrated in Fig. 4. The pattern to be identified is initially scanned in scanner 40 and stored in the multi-dimensional register 41. In the register the pattern is spatially arranged, element by element, into a prescribed pattern, and thereupon systematically shifted through the register, e.g., in a rectilinear fashion in two coordinate directions. A selected group of contiguous register elements forming, for example, a two dimensional window whose dimensions approximate the expected size of the pattern, are monitored by the individual channels of a computer 42*a, b, c* . . . ; each channel monitoring all of the elements comprising the window. As the pattern is effectively shifted through the register each computer is continuously supplied with those portions of the pattern that are encompassed by the reading elements forming the window and each continuously computes a signal-to-noise ratio. The highest ratio obtained in each channel is retained. When the pattern has finally been shifted through all portions of the area, the stored outputs of the computer 42 are compared to one another in a comparator 43, and if the largest stored ratio is acceptable, i.e., if the ratio both is above a pre-established threshold level, and is sufficiently greater than the next highest ratio, a code of the character represented is delivered as an output.

Scanner 40 may assume any form well known in the art. It may, for example, comprise an electro-optical scanner utilizing a moving light beam focused onto the character and an array of photocells arranged to observe the reflections from the character. Signals produced by the photocells are supplied to the register 41.

Figure 5:
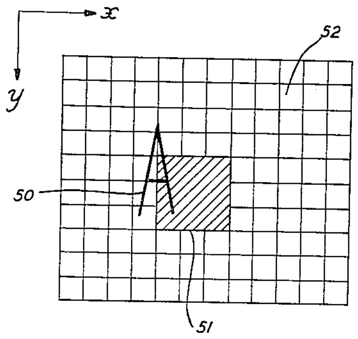
Fig. 5 is an illustration helpful in explaining the operation of the apparatus of Fig. 4.

The two-dimensional shifting function of the register similarly may be implemented in various ways. The required operation is illustrated diagrammatically in Fig. 5. The elements forming the pattern 50, i.e., the matrix cells occupied by the pattern, are explored as by systematically passing each element of the matrix area 52 beneath the read window 51. This is preferably done by following a rectilinear scanning path, for example, from left to right in the *x* direction at a first rate and down in the *y* direction at a lesser rate. In effect all that is necessary is that all elements of the matrix 52 have been interrogated by each cell of the window matrix 51. The exact scanning format is thus immaterial.

Figure 6:
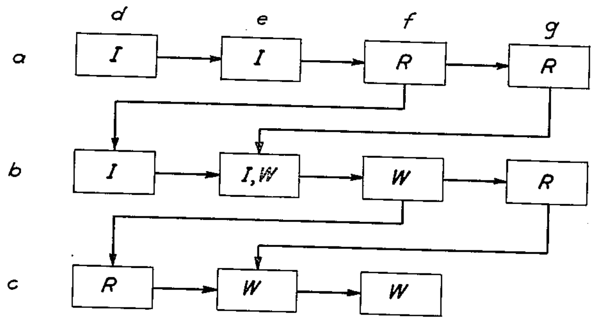
Fig. 6 is a block schematic diagram of one representative form of two-dimensional register in accordance with the invention.

The two-dimensional register 41 may be of any desired type but a convenient one comprises a conventional shift register connected in the manner illustrated in Fig. 6. For simplicity of exposition a register is shown for translating a 2 x 2 pattern in each of four directions past a 2 x 2 interrogation window. Elements of the register designated I (input) are arranged to receive signals produced by the scanner and to assume one of two binary states in accordance with the occupancy of a corresponding portion of a matrix superimposed figuratively on the input pattern. Elements marked W (window) are connected as read elements. The four W elements in the apparatus of Fig. 6 are provided with output terminals for transferring to the channel computers signals indicating the state of the binary read (window) elements. In the simplified example three horizontal rows *a*, *b*, and *c*, of elements only are employed since the input information shifted below the window elements is not required. Similarly the element at row *c* column *g* is not required. In operation the following sequence of events transpires:

(1) The scanner output is read into the I elements of rows *a* and *b* of the shift register to form a spatially oriented pattern corresponding to the pattern matrix; in the instant example the pattern occupies the upper left-hand block of four elements;

(2) The stored pattern is shifted to the right to occupy successively the elements of columns *f* and *g*;

(3) The pattern is returned to the left-hand columns *d* and *e* and shifted downward to occupy rows *b* and *c*;

(4) The pattern is again shifted to the right one column at a time;

(5) The pattern is returned to the left, shifted down and again moved to the right; and (6) The above sequence is repeated until all elements of the pattern have passed through the elements W forming the read window.

If the pattern bits are represented by

| | |
|---|---|
| A | B |
| C | D |

the window sees the following sequence as the pattern translates through the register:

| | | | | | |
|---|---|---|---|---|---|
| (1) | DO<br>OO | (2) | CD<br>OO | (3) | OC<br>OO |
| (4) | BO<br>DO | (5) | AB<br>CD | (6) | OA<br>OC |
| (7) | OO<br>BO | (8) | OO<br>AB | (9) | OO<br>OA |

Thus the input pattern is translated through the register and is observed by the window of W elements in nine different configurations, one of which closely centers the pattern in the window. It is for this centered position (position 5 in the example) that the maximum signal-to-noise ratio will be produced.

Figure 7:
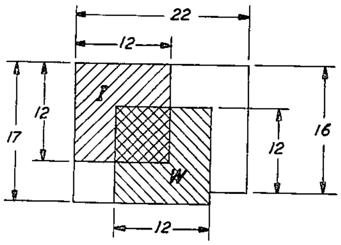
Fig. 7 is a diagram helpful in explaining the operation of the apparatus of Fig. 6.

The extension of this shifting procedure to a multiple cell input pattern, for example, a 12 x 12 element pattern is illustrated in Fig. 7. The dimensions required for the register in terms of twelve elements and a maximum shift of five elements in each direction are indicated on the figure.

Figure 8:
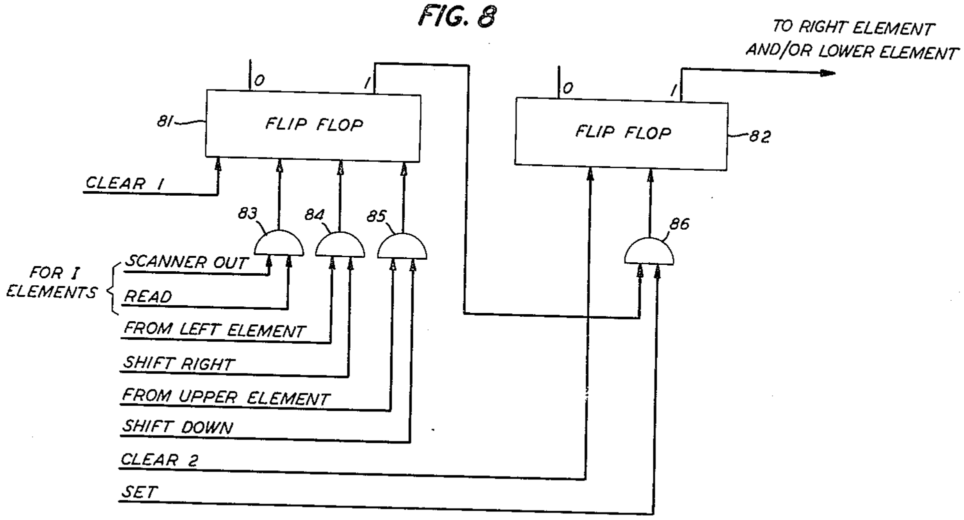
Fig. 8 is a block schematic diagram showing details of operation of portions of the apparatus of Fig. 6.

Fig. 8 illustrates a typical element of the register shown in Fig. 6. It comprises essentially a series of flip-flops 81 and 82, the first of which is energized, if it represents an I element, by the scanner output signal and a periodic setting signal (read) through AND gate 83 thus to set the flip-flop 81 to indicate the binary condition of a pattern cell. A typical sequence of timing pulses for carrying out the required transfer is as follows:

(1) Clear 1 } clear shift register of old pattern
(2) Clear 2 }
(3) Read—read in new pattern
(4) Set } prepare to shift
(5) Clear 1 }
(6) Shift right—shift pattern right one element
(7) Clear 2
(8) Repeat 4 through 7
(9) Set }
(10) Clear 1 } shift pattern down one element and to the left
(11) Shift down }
(12) Clear 2 }
(13) Repeat steps 4 through 13 ten times to shift position in all desired locations.

At a one megacycle clock rate the above sequence of operation requires approximately 0.5 millisecond. A new pattern may be read into the computer channels during the interval between each pair of set and clear 2 pulses. This time is available for each computer to perform the required computation.

Figure 9:
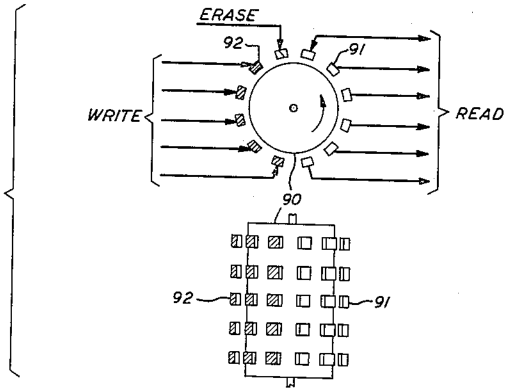
Fig. 9 is an illustration of a magnetic drum system suitable for performing the functions of a two-dimensional register in accordance with the invention.

A magnetic drum register may also be employed to perform the required shifting operation. Fig. 9 illustrates both in top and plan views a magnetic drum 90 provided with an array of read heads 91 and write heads 92 suitable for performing the operation. The read heads are positioned about the surface of one side of the drum and the write heads are positioned about the other. If the pattern read into the drum is to occupy a matrix area of 12 x 12 elements and is to be shifted five elements in each direction, twelve read heads and twelve write heads are provided in each of seventeen circumferential rings, all of the rings being spaced suitably along the entire length of the drum. The pattern is thus read into a portion of the drum as the drum passes beneath the write heads and read out as the drum rotates beneath the read heads selected to form the window. One column of erase heads erases stored material before new material is recorded on the drum.

Figure 10:
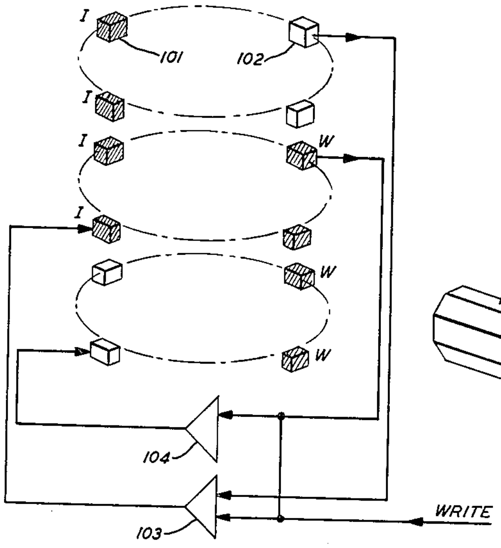
Fig. 10 is a perspective view illustrating the relative spatial locations of magnetic heads of the apparatus of Fig. 9.

By suitably programming the application of the pulses to the heads the downward motion may be easily accomplished. Fig. 10 illustrates pictorially the circuit required in a magnetic drum arranged for translating the elements in a 2 x 2 matrix pattern beneath an interrogation window. Two circumferentially positioned read and write heads in each of three axial rows are required in this arrangement. The connections between one column of write heads and one column of read heads are shown in detail. Similar connections are provided for the other columns. The pattern is recorded on the drum by the write heads 101 comprising the I elements (shaded in the drawing). As the drum rotates the recorded pattern passes beneath the read heads 102. The read heads forming the interrogation window (shown shaded also) are exposed first with the pattern shifted up and to one side. As the drum continues its rotation the window observes the pattern centered circumferentially but shifted axially by one element spacing. Finally the window observes the pattern shifted to the uppermost row of elements on the opposite side of the drum. By pulsing the write amplifiers 103 and 104 at the instant that the pattern is centered circumferentially, the write heads deposit a new pattern on the drum. This pattern is identical to the first recorded pattern but is shifted down on the drum by one element spacing. The second pattern then passes beneath the read heads and constitutes a complete circumferential shift with the pattern centered axially. The process continues until the pattern has been shifted with respect to the window elements into all possible locations. Timing may be accomplished by providing a suitable timing track on the magnetic drum or in any other well known fashion. Erase heads are suitably positioned about the drum and periodically energized.

Figure 11:
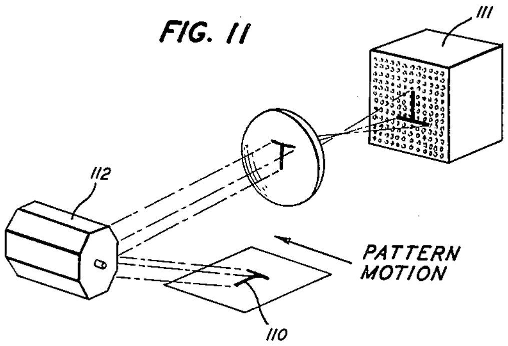
Fig. 11 is a perspective view of yet another form of two-dimensional register suitable for use in the practice of the invention.

As an alternative, a somewhat less complex and at the same time a somewhat more economical method may be employed for maximizing the measured signal-to-noise ratio. For example, the electro-optical apparatus shown in Fig. 11 may be employed. The shifting function is accomplished optically by reflecting the applied pattern 110 on a two-dimensional array of photocells 111 by means of a segmented mirror 112. As the mirror is rotated, the pattern is shifted, e.g., in a vertical direction, across the photocell bank. When the pattern is eventually shifted off the bank, the next mirror segment reflects the character so that it again appears at the lower edge of the array 111 and moves vertically across the bank. Horizontal shifting is accomplished by moving the pattern itself; for each vertical shift the pattern bearing document is moved horizontally one matrix element spacing. Although the vertical shift is thus slightly skewed, if the document motion is continuous, the scanning procedure has been found, nevertheless, to be quite satisfactory. In a typical mode of operation a mirror drum with sixteen segments is employed and rotated at approximately 2000 revolutions per minute. It completely shifts a character ±5 elements in approximately twenty-one milliseconds. As before, the photocells of the array 111 form the W elements and are monitored independently by a channel computer for each true signal in the alphabet.

Figure 12:
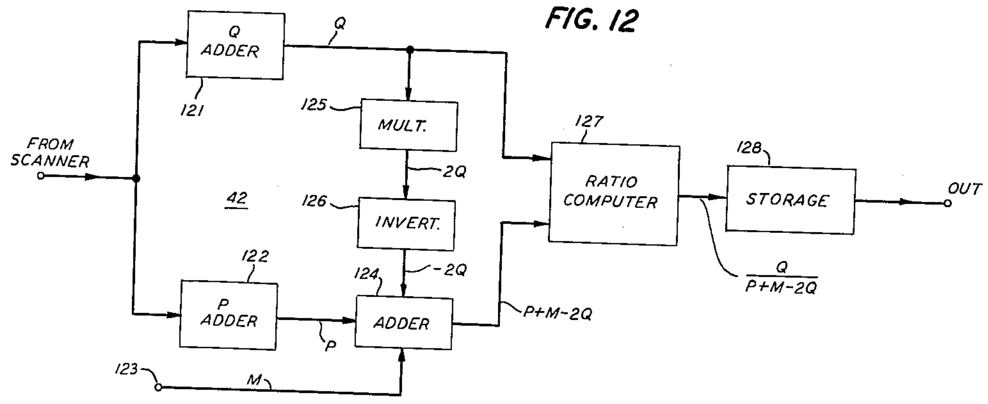
Fig. 12 is a block schematic diagram of a typical channel computer suitable for use in the apparatus of Fig. 4.

Returning again to a consideration of the apparatus of Fig. 4, as the pattern is shifted through the register 41, of whatever design, the read elements forming the window thereof simultaneously supply information specifying the occupancy of the matrix cells to the inputs of all of the computer channels 42; i.e., the inputs of all of the computers are connected in parallel. The individual channel computers 42 may be constructed in any desired fashion. A block schematic diagram of one suitable form is shown in Fig. 12. It is designed to evaluate the signal-to-noise ratio of the applied pattern according to Equation 1. Information accumulated by the register is simultaneously applied to two adders 121 and 122. Adder 121, designated the Q adder, evaluates the cross-correlation function between the scanned pattern and the probability matrix of the true signal for which the amplifier is programmed. Since the cross-correlation function is equal to the sum of the probabilities of the occupied elements, the adder 121 need comprise only a resistive adder whose individual arms are proportioned to provide for each cell of the register window the probability factor for the corresponding element of the true signal. Adder 122, designated the P adder, evaluates the number of elements marked by the pattern by effectively counting the number of pulses transferred to the register from the scanner. Since the function P is invariant for a particular pattern, the adder need comprise only a resistive adder whose individual arms are identical, or a suitable integrator. Since the factor M of equation 1, which represents the sum of the squares of the probabilities in the matrix for the particular character, is a function of the probability matrix only, it is a system function and is therefore built into the computor, as by injecting a current of pre-established magnitude into the M input 123.

The sum $P+M-2Q$ is formed by adding P, derived in adder 122, and the quantity M from terminal 123, together in adder 124, and by adding to this sum the quantity $-2Q$. The latter quantity may conveniently be obtained by passing the output of Q adder 121 through multiplier 125, arranged to multiply the applied function by the fixed quantity 2, and inverting the polarity of this signal in invertor 126. The output of adder 124, equivalent to the sum $P+M-2Q$, is applied together with the sum Q to ratio computer 127 wherein the ratio $$\frac{Q}{P+M-2Q}$$

is formed. This quantity is stored as, for example, in analog storage element 128 and supplied to comparator 43 along with the stored outputs of all other channel computers.

Figure 13:
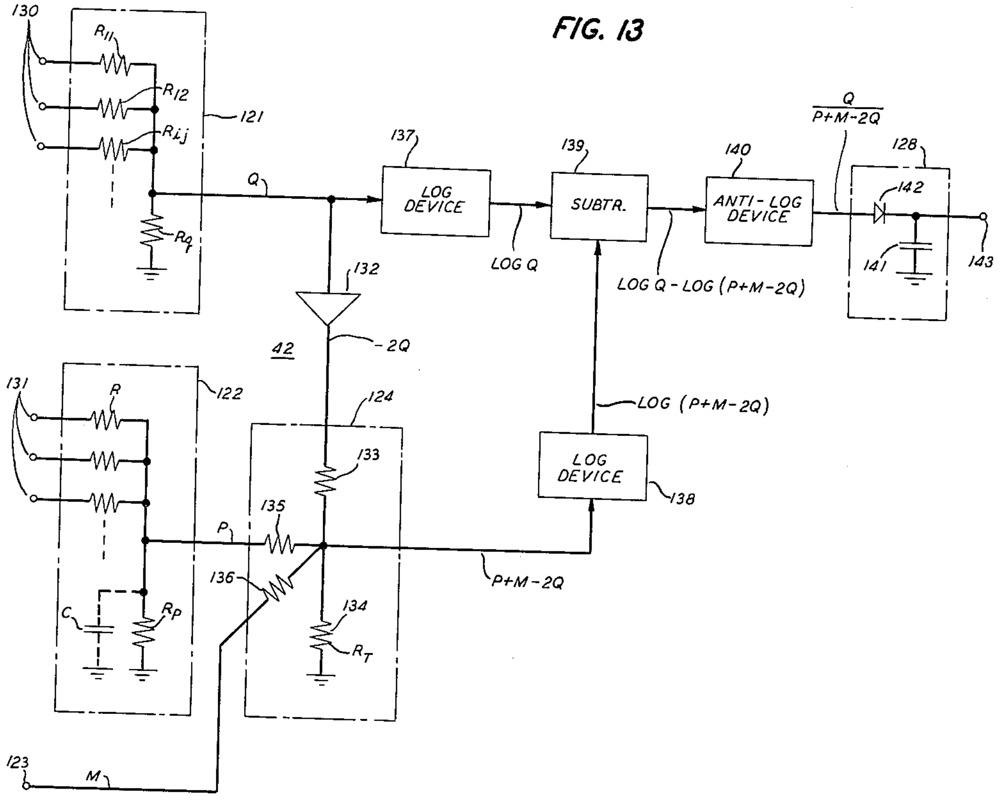
Fig. 13 is a detailed schematic diagram partially in block schematic form illustrating the operation of the apparatus of Fig. 12.

Fig. 13 illustrates, with somewhat more detail, the construction of a suitable channel computer 42. The adders 121 and 122 may be of like construction. Adder 121 comprises, for example, a resistive network including a number of resistors $R_{11}$, $R_{12}$, $R_{ij}$; one for each element of the probability matrix specifying one true signal (and hence one for each element of the read window). For each momentary position of the pattern in the register, a voltage corresponding to the condition of occupancy of each element is applied to the appropriate input terminal 130 of the adder. The value of each of the resistors R is chosen so that the current through it is proportional to the probability of the element which it represents, e.g., in accordance with the values specified in the matrices of a selected row of Fig. 1 or the like. The total current passed by all of the resistors flows through resistor $R_q$. It is proportional to the sum of the input currents and is a measure of the sum of the probabilities of the marked elements. Hence, the potential developed across $R_q$ is a measure of Q. Adder 122 comprises a resistive network including a number of resistors R. Binary voltages representing the occupancy condition of the elements are applied to terminals 131, and passed through the resistors R which are chosen to be identical for each channel. The total current is passed through resistor $R_P$ and the potential developed thereacross represents the function P. If, however, scanning proceeds on a line-by-line basis, the total current from several scanning lines, is integrated, for example, in the network $R_PC$.

The Q signal developed across the resistor $R_q$ is passed through amplifier 132, whose gain is adjusted to $-2$, i.e., the signal is multiplied by a factor of 2 and inverted in polarity. The resultant signal, $-2Q$, is passed through isolation resistor 133 and summing resistor 13. Similarly, the P signal and a constant signal M are passed through isolation resistors 135 and 136 respectively and through summing resistor 134. As a result, the signal $P+M-2Q$ appears at the output of adder 124.

Although a number of suitable circuits are available for forming the quotient $$\frac{Q}{P+M-2Q}$$

one relatively simple one is implemented by deriving a signal proportional to the logarithms of the dividend Q, and of the divisor $P+M-2Q$, subtracting one of the logarithms from the other, and converting the logarithm signal difference into its antilogarithm. Logarithm and antilogarithm devices are well known in the art and may employ, for obtaining a signal proportional to the logarithm of the function, one of a variety of devices having logarithmic characteristics, and for converting the logarithm quotient to its antilogarithm, any of a variety of devices having an exponential characteristic.

Accordingly, in the apparatus of Fig. 13 the Q signal is applied to the logarithm network 137 which produces a signal proportional to logarithm Q, and the signal derived from adder 124 is passed through logarithm network 138 to produce a signal proportional to the logarithm $P+M-2Q$. The difference between the two logarithms is obtained by passing both signals through subtractor 139, and the difference signal is converted into its antilogarithm in antilogarithm device 140. The output of device 140 is proportional to the quotient which, by Equation 1 is a measure of the signal-to-noise ratio of the applied character compared to the true signal for which the computer is designed. It is applied to storage element 128 which may comprise, for example, a diode-fed capacitor 141. Capacitor 141 charges up to the highest voltage that appears at the input of diode 142, and stores that value to represent the best match of the input character with the true signal.

Thus, each one of the channel computers 42 used in the apparatus of Fig. 4 in effect accepts the best match of the input pattern and the corresponding true signal and, for this match, computes the signal-to-noise ratio in accordance with Equation 1. A separate computer evidently is required for each true signal in the alphabet. It is of course within the scope of the invention to design the computer 42 to compute various other ratios, e.g., to implement Equation 4, and to compute signal-to-noise ratios on the basis of normalized or otherwise modified matrix values.

Figure 14:
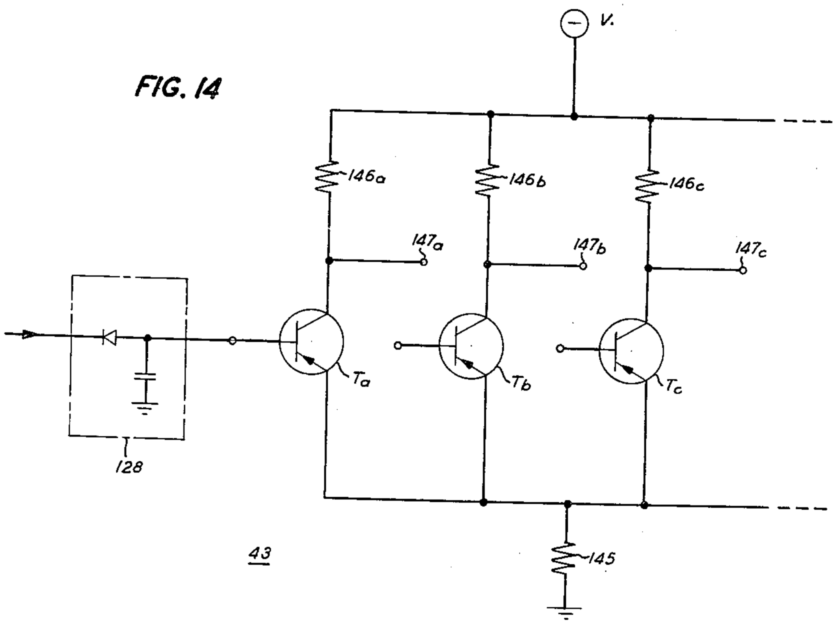
Fig. 14 is a schematic diagram of a ratio comparator suitable for use in the practice of the invention.

The output of each of the channel computors 42 is supplied to comparator 43 (referring again to Fig. 4), wherein the largest signal-to-noise ratio is selected and utilized to indicate the corresponding true signal best represented by the scanned pattern. Comparator 43 comprises typically a network of the form shown schematically in Fig. 14. Each computing channel supplies to the base of one of the transistors T, the stored signal representing the highest value of signal-to-noise ratio for that channel. The emitters of the transistors are returned to a reference potential, e.g., ground, through common resistor 145, and the collectors are connected independently through resistors 146, to a suitable bias source $-V$. If the base of one of the transistors T is negative as compared to its emitter, the transistor conducts, and its emitter assumes essentially the base potential, but if the base is positive as compared with its emitter, it is cut off. Hence, the output of a transistor is either a lower negative potential, e.g., close to ground, if the input is more negative than the input of any other transistor, and is at the source potential $-V$ if it does not have the highest base potential. In other words, only the transistor with the most negative base voltage is saturated; all others are cut off. The output of the saturated transistor appearing on one of the output terminals 147, connected to the corresponding collector, is coded into suitable form as by employing diode or transistor-resistor logic elements. If desired, the bias voltage required for saturation can be selected to prevent saturation below a pre-established threshold, thus to reject scanned patterns for which the probability of a match from among the stored alphabet of true signals is in doubt. Also, in the event that the two greatest inputs to the comparator are of comparable amplitude, then no transistor will completely saturate, and this condition can also be used to effect rejection of the input character.

The above-described arrangements are illustrative of specific embodiments of the principles of the invention. Numerous other arrangements may, of course, be devised by those skilled in the art without departing from the spirit and scope of the invention.

What is claimed is:

1. Apparatus for classifying line trace patterns comprising a record containing a line trace pattern, scanning means for detecting those portions of said pattern that occupy preselected portions of a matrix of areas that together encompass said pattern, means for storing a plurality of probability matrices, the individual areas of each of said probability matrices being suitably weighted in accordance with the occupancy probability of that area by a pattern from a selected ensemble of patterns, means for systematically comparing said detected pattern portions with corresponding areas of all of said probability matrices, means for developing a signal whose magnitude is proportional to the degree of correlation between said pattern portions and each of said stored matrices.

2. The apparatus defined in claim 1 wherein each of the individual areas of each of said stored probability matrices is normalized by a factor proportional to the sum of the squares of the probabilities in the matrix for the corresponding selected pattern.

3. The apparatus of claim 1 wherein the individual areas of each of said stored probability matrices is modified by assigned negative probability values to the individual areas of said matrices whose probability of occurrence for said corresponding selected pattern is below a pre-established threshold.

4. Apparatus for classifying characters comprising, in combination, means for scanning characters, means responsive to said scanning means for producing output signals when said scanning means senses portions of said character, register means for storing said output signals, means for sequentially transferring selected output signals to each of a plurality of computers, each of said computers being individually programmed to evaluate a ratio of signal-to-noise of the scanned output signal magnitudes as compared with the magnitude of signals representative of the probability of occurrence of portions of a scanned character in a pre-assigned character, and means for selecting the largest of said computed ratios to identify said character.

5. Apparatus as defined in claim 4 wherein said means for sequentially transferring selected output signals to each of a plurality of computers comprises a multisectional storage element for storing individually said output signals in an order indicative of the spatial orientation of the corresponding sensed character portions, and means for sequentially interrogating selected ones of said storage elements to supply said stored signals to an output circuit.

6. Apparatus as defined in claim 5 wherein a plurality of said storage elements are simultaneously interrogated.

7. Apparatus according to claim 4 wherein each of said computers comprises adder means supplied with said output signals for producing a first signal proportional to the sum of the probabilities assigned to said selected areas, adder means supplied with said output signals for producing a second signal proportional to the total number of selected areas, a source of third signals proportional to the probability of occurrence of character portions in said pre-assigned character, means for algebraically adding said first, said second, and said third signals, and means for producing an output signal proportional to the ratio of said first signal to said algebraic combination of signals.

8. Apparatus for automatically classifying line trace characters comprising in combination, a spatially oriented array of individual sources of digital input information, means for storing digital information derived from said array, means for storing a plurality of spatially oriented arrays of digital information, the individual digits of each selected according to the probability of occurrence of that digit in an array representative of one pre-assigned pattern, means for systematically comparing stored digital information from said sources with each of said stored matrices of probability digits, means responsive to the correlation of said digital information derived from said sources with digital information stored in said probability arrays for developing a signal whose magnitude is proportional to the degree of correlation between said signals, and means responsive to signal magnitudes exceeding a pre-established threshold for producing unique activity representative of the pattern represented by said stored array of information.

9. Apparatus for classifying line trace characters comprising, a spatially oriented array of individual sources of digital information, means for storing digital information derived from said array, means for storing a plurality of matrices of digital information, the individual digits of each selected according to the probability of occurrence of that digit in a matrix representative of one pre-assigned pattern, means for systematically comparing stored digital information from said sources with each of said stored matrices of probability digits, means responsive to the correlation of said digital information from said sources with digital information stored in said matrices for developing a signal whose magnitude is proportional to the degree of correlation therebetween, and means responsive to signal magnitudes exceeding a pre-established threshold for producing unique activity representative of the pattern represented by said stored matrix.

10. In apparatus for classifying patterns in terms of the correlation between selected elements of applied patterns and a plurality of stored probability matrices of elements each representative of one pattern of an ensemble, means for increasing the differential between the correlation functions computed for the applied pattern as compared with different ones of the patterns of said ensemble comprising means for deriving from said applied pattern a function P where P is equal to the number of distinguishable elements forming the pattern, means for deriving from each of the stored matrices of elements a function M where M is equal to the sum of the squares of the probabilities in a matrix, means for deriving cross-correlation functions Q between said applied pattern and each of said probability matrices, means for computing for each of said matrices a ratio equal to $$\frac{Q}{P+M-2Q}$$

and means for selecting the largest of said ratios to provide a manifestation indicative of the applied pattern.

11. Apparatus as defined in claim 10 wherein said function P and the probability values assigned to the elements of said stored probability matrices are normalized by a function proportional to the function M.

12. Apparatus as defined in claim 10 wherein said means for computing for each of said matrices a ratio equal to $$\frac{Q}{P+M-2Q}$$

comprises amplifier means supplied with said function Q for producing a function proportional to −2Q, adder means supplied with said function P, said function M, and said function −2Q for producing a function equal to $P+M-2Q$, means supplied with said function $P+M-2Q$ for generating a function proportional to the logarithm of the function $P+M-2Q$, means supplied with said function Q for generating an output function proportional to the logarithm of the function Q, subtractor means supplied with said logarithmic functions for producing a function proportional to the difference therebetween, and means supplied with said difference function for generating an output signal proportional to the antilogarithm of said difference function.

13. In apparatus for classifying line trace characters, means for scanning an area containing at least one character, means for generating electrical indications of portions of a character in said area sensed by said scanning means, multicell register means for storing said indications of sensed portions of said area in an order that preserves the spatial orientation of the sensed character portions, means for simultaneously interrogating a selected plurality of cells of said register, said plurality of cells being selected to encompass a spatial area sufficiently large to encompass one character only, means for advancing said interrogation means sequentially to encompass all of the stored indications representative of said entire scanned area, means for comparing each of said interrogated indications with each of a plurality of stored matrices of character portions, each stored matrix being representative of a different character in an ensemble, and means for developing a signal whose magnitude is proportional to the degree of correlation between said interrogated indications and each of said stored matrices of characters.

14. The method of classifying patterns in terms of the correlation between selected elements of applied patterns and a plurality of stored probability matrices of elements each representative of one pattern of an ensemble, which comprises the steps of deriving from said applied pattern a function P where P is equal to the number of distinguishable elements forming the pattern, deriving from each of the stored matrices of elements a function M where M is equal to the sum of the squares of the probabilities in the matrix, deriving cross-correlation functions Q between said applied pattern and each of said probability matrices, computing for each of said matrices a ratio equal to $$\frac{Q}{P+M-2Q}$$

and selecting the largest of said ratios to provide a manifestation indicative of the applied pattern.

No references cited.